(12) United States Patent
Mann et al.

(10) Patent No.: US 6,947,969 B2
(45) Date of Patent: Sep. 20, 2005

(54) SYSTEM AND METHOD FOR ACCESSING VOICE MESSAGING SYSTEM DATA

(75) Inventors: James W. Mann, Pottstown, PA (US); Alex C. Freiman, New Britain, PA (US)

(73) Assignee: Unisys Corporation, Blue Bell, PA (US)

( * ) Notice: Subject to any disclaimer, the term of this patent is extended or adjusted under 35 U.S.C. 154(b) by 851 days.

(21) Appl. No.: 09/876,811

(22) Filed: Jun. 7, 2001

(65) Prior Publication Data

US 2002/0188686 A1 Dec. 12, 2002

(51) Int. Cl.[7] .................. H04M 11/00; G06F 15/16
(52) U.S. Cl. ................ 709/206; 379/88.17; 379/88.18; 379/211.02
(58) Field of Search ............ 709/206; 379/88.04–88.26, 379/211.02, 212.01; 705/14; 455/413

(56) References Cited

U.S. PATENT DOCUMENTS

| | | | |
|---|---|---|---|
| 5,406,557 A | | 4/1995 | Baudoin |
| 5,568,540 A | | 10/1996 | Greco et al. |
| 5,787,153 A | | 7/1998 | Bankay et al. |
| 5,796,394 A | | 8/1998 | Wicks et al. |
| 5,909,483 A | | 6/1999 | Weare et al. |
| 5,948,059 A | * | 9/1999 | Woo et al. .......... 709/206 |
| 5,963,618 A | * | 10/1999 | Porter ............ 704/270.1 |
| 6,157,945 A | | 12/2000 | Balma et al. |
| 6,430,177 B1 | * | 8/2002 | Luzeski et al. ........ 370/356 |
| 6,697,457 B2 | * | 2/2004 | Petrushin ............. 379/88.08 |

OTHER PUBLICATIONS

International Search Report, Dec. 13, 2002.
Written Opinion, Apr. 9, 2003.
International Preliminary Examination Report, Oct. 14, 2003.

* cited by examiner

*Primary Examiner*—Jeffrey Pwu
(74) *Attorney, Agent, or Firm*—Mark T. Starr; Michael B. Atlass; Woodcock Washburn

(57) ABSTRACT

A second computer accesses voice messaging system data residing on a first computer. The second computer receives a log record range selection from a user interface, creates a log record selection file based on the log record selection, and sends the file to the first computer. The second computer reads a log record file that is received by the second computer in response to sending the file to the first computer. The second computer extracts a log record, receives a log record selection from the user interface, and determines a voice message identification corresponding to the selected log record. The second computer creates a voice message selection file and sends the file to the first computer. The second computer reads a voice message file that is received by the second computer in response to sending the file to the first computer, and extracts a voice message from the file.

48 Claims, 7 Drawing Sheets

SYSTEM AND METHOD FOR ACCESSING VOICE MESSAGING SYSTEM DATA

FIELD OF THE INVENTION

The present invention generally relates to the field of voice messaging systems. More particularly, the present invention relates to accessing voice messaging system data via a personal computer or other processor.

BACKGROUND OF THE INVENTION

Messaging systems often provide voice processing capabilities that are utilized to both process and simulate human speech. One example of such a messaging system is the Communications Application Platform (CAP) ("the CAP system") commercially available from UNISYS Corporation (Blue Bell, Pa.). The CAP is a configuration of hardware and software that provides data and voice processing capabilities through applications running on a host computer system. The CAP, in combination with a network interface unit (NIU), provides the interface between these applications, called network applications, and a telephone network. The CAP is implemented on selected UNISYS A Series and CLEARPATH HMP NX computer systems (available from UNISYS Corporation (Blue Bell, Pa.)) running the UNISYS MCP operating system. Further details of the structure and function of the CAP are provided in the following issued patents and pending applications, all of which are hereby incorporated by reference in their entireties:

U.S. Pat. No. 5,133,004, issued Jul. 21, 1992, entitled "Digital Computer Platform for Supporting Telephone Network Applications";

U.S. Pat. No. 5,323,450, issued Jun. 21, 1994, entitled "Telephone Network Applications Platform for Supporting Facsimile Applications";

U.S. Pat. No. 5,384,829, issued Jan. 24, 1995, entitled "Digital Computer Platform for Supporting Telephone Network Applications";

U.S. Pat. No. 5,493,606, issued Feb. 20, 1996, entitled "Multi-Lingual Prompt Management System for a Network Applications Platform";

U.S. Pat. No. 6,058,166, issued May 2, 2000 entitled "Enhanced Multi-Lingual Prompt Management in a Voice Messaging System With Support for Speech Recognition";

U.S. patent application Ser. No. 09/161/214, filed Sep. 25, 1998, entitled "Multiple Node Messaging System Wherein Nodes Have Shared Access To Message Stores Of Other Nodes";

U.S. patent application Ser. No. 09/307,014, filed May 7, 1999, entitled "Inter-System Call Transfer";

U.S. patent application Ser. No. 09/451,077, filed Nov. 30, 1999, entitled "Method and Apparatus for Preventing Hung Calls During Protocol Violations in a Voice Messaging System";

U.S. patent application Ser. No. 09/636,656, filed Aug. 11, 2000, entitled "Network Interface Unit Having an Embedded Services Processor"; and U.S. patent application Ser. No. 09/636,677, filed Aug. 11, 2000, entitled "Adjunct Processing Of Multi-Media Functions In A Universal Messaging System".

Site support of a voice messaging system is an important aspect of providing and/or maintaining a voice messaging system. While there are many facets of voice messaging system support, automatic speech recognition (ASR) may be difficult to support without proper tools. This particular functionality is often included in current voice messaging systems.

For example, a voice messaging system may prompt a telephone-based subscriber with a prompt such as "Press or say 'One'". In response to such prompt, the telephone based subscriber may press 'One' on a telephone keypad. Alternatively, the telephone based subscriber may speak 'One' into the telephone which generates a voice signal (i.e., a voice message). The voice messaging system receives the voice message, processes the voice message, and attempts to recognize the voice message as a word. In addition to processing the voice message, the voice messaging system may store the voice message in a voice message data store, and may save a call information log record to a log data store. The log record typically includes a timestamp, a mailbox address, a voice message identification, and the like.

A voice messaging system must deal with many different speech accents, background noise, and other variables. As such, ASR techniques are not always sufficiently accurate. When ASR techniques do not successfully recognize a spoken word, site support personnel desire a tool allowing easy access to stored voice messages and to stored call information. However, direct access to a voice messaging system is often limited for reliability and security purposes because granting such access to multiple users may jeopardize the integrity of the voice messaging system.

Moreover, access to a stored voice message and to a stored log record in a voice messaging system is typically cumbersome. That is, a voice messaging system does not usually include user-friendly graphic interfaces normally associated with personal computers or other processors.

Further, a voice messaging system typically stores voice messages and log records in different data stores. For example, voice messages may be stored in a voice message data store and log records may be stored in a log data store, as described above. The log data store is typically used for billing purposes and the voice message data store is typically used for site support and troubleshooting. Because the log data store and the voice message data store are typically separate data stores, it is often cumbersome to access a particular voice message corresponding to a particular log record.

Additionally, access to each data store is handled by a separate application. Typically, a voice messaging application interfaces with the voice messaging data store and a log record application interfaces with the log data store. As such, with conventional site support tools, a user (e.g., site support technician) interfaces with two applications to receive voice messaging system data.

For example, a user may access a particular log record from log record data store via the log record application. Typically the log record contains a voice message identification field containing a voice message identification of the voice message corresponding to the log record. The user may extract the voice message identification from the log record. The voice message identification is then used to retrieve a corresponding voice message from the voice message data store. However, this typically is accomplished via the voice message application. A user therefore should be familiar with two applications. Additionally, a user manually enters the voice message identification for use by the voice message application rather than the two applications cooperating to provide the voice message.

Moreover, audibly playing a particular voice message may be cumbersome. For example, a previous site support tool required a user to place a phone call to a special application in a voice messaging system in order to listen to the particular voice message.

In view of the above problems, there is a recognized need for a system and method for accessing voice messaging system data via a personal computer or other processor. The present invention satisfies this need.

SUMMARY OF THE PRESENT INVENTION

The present invention is directed to a system and method for accessing voice messaging system data via a personal computer or other processor.

According to an aspect of the present invention, access is provided to voice messaging system data residing on a host computer, via a processor. The voice messaging system data includes a plurality of voice messages and a log record corresponding to each voice message. A log record range selection is received from a user interface of the processor. A log record selection file is created based on the log record range selection. The log record selection file is sent to the host. A log record file is read, the log record file being received by the processor in response to sending the log record selection file to the host. A log record is extracted from the log record file.

According to another aspect of the present invention, a log record selection is received from the user interface. A voice message identification corresponding to the selected log record is determined. A voice message selection file is created based on the voice message identification corresponding to the selected log record. The voice message selection file is sent to the host. A voice message file is read, the voice message file being received by the processor in response to sending the voice message selection file to the host. A voice message is extracted from the voice message file.

According to a further aspect of the present invention, transcription data is received from the user interface and the received transcription data is stored to a data store of the processor.

These and other features of the present invention will be more fully set forth hereinafter.

BRIEF DESCRIPTION OF THE DRAWINGS

The present invention is further described in the detailed description that follows, by reference to the noted plurality of drawings by way of non-limiting embodiments of the present invention, in which like reference numerals represent similar parts throughout the several views of the drawings, and wherein:

FIG. 6 is a screen shot of a voice message selection screen employed in connection with the method of FIG. 3 in accordance with one embodiment of the present invention; and FIG. 7 is a screen shot of a transcription screen employed in connection with the method of FIG. 3 in accordance with one embodiment of the present invention.

DETAILED DESCRIPTION OF THE ILLUSTRATIVE EMBODIMENTS

The present invention is directed to a system and method for accessing and integrating voice messaging system data via a personal computer or other processor.

Voice Messaging System

Figure 1:
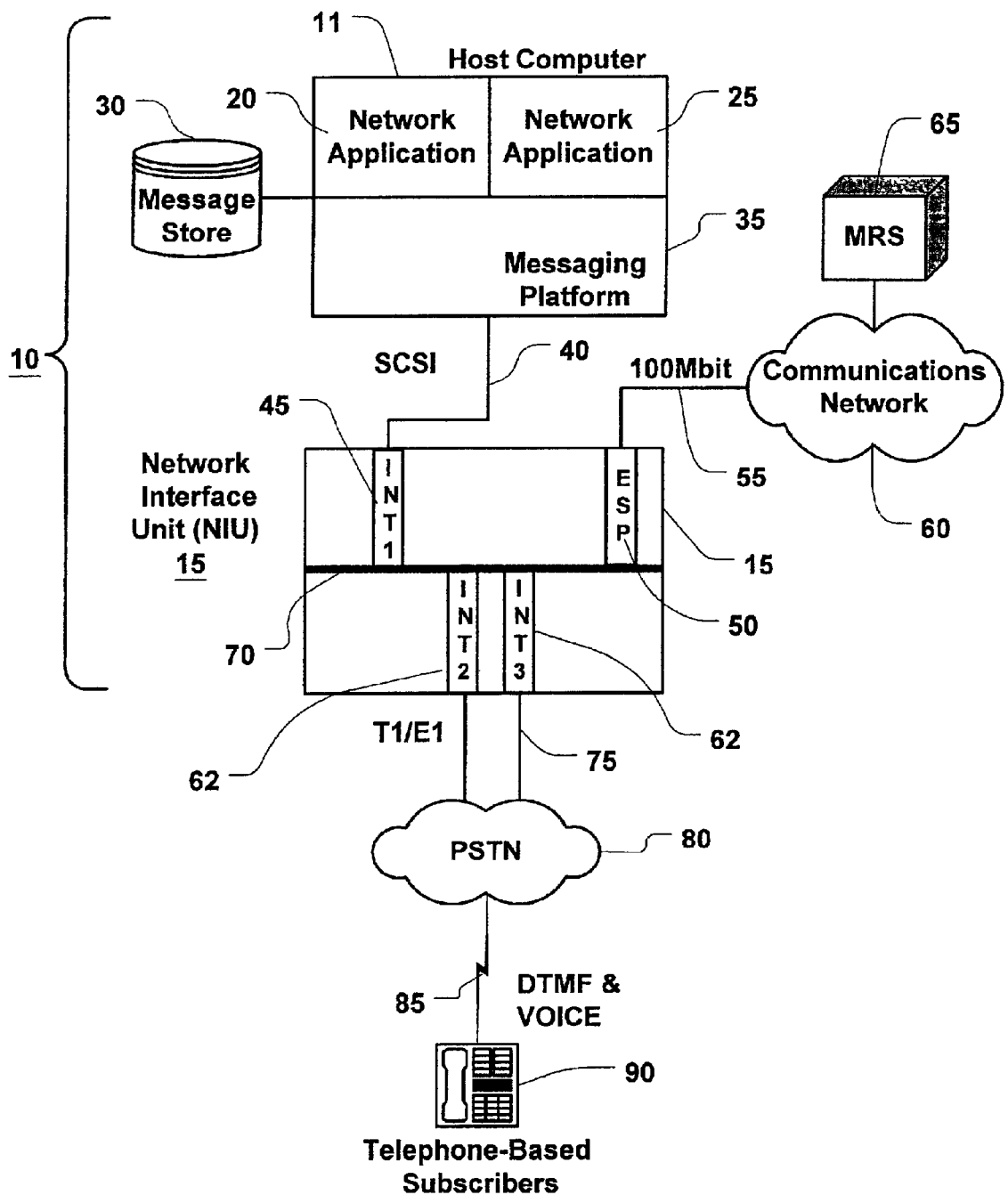
FIG. 1 is a block diagram of an exemplary voice messaging system with which the present invention may be employed.

Referring now to the drawings wherein like numerals indicate like elements throughout, there is shown in FIG. 1 a block diagram of an exemplary messaging system 10 in connection with which the present invention may be employed. Voice messaging system (VMS) 10 comprises host computer 11 electronically coupled to Network Interface Unit (NIU) 15. In turn, NIU 15 is electronically coupled to Public Switched Telephone Network (PSTN) 80 that supports telephone-based subscribers 90. As shown, host computer 11 comprises a messaging platform 35 that executes network applications 20 and 25, respectively. In addition, messaging platform 35 may allow network applications 20 and 25 to cooperate with message store 30. Message store 30 may be used by messaging system 10 to store data for telephone-based subscribers 90. In this example, messaging platform 35 may comprise the aforementioned Network Applications Platform (CAP) commercially available from UNISYS Corporation (Blue Bell, Pa.), and host computer 11 on which the CAP runs may comprise a selected UNISYS A Series or CLEARPATH HMP NX computer system. It is understood, however, that the present invention is by no means limited to use with the UNISYS CAP system, but rather can be employed in connection with any messaging platform that performs voice processing using one or more voice processing engines.

Still referring to FIG. 1, NIU 15 contains a series of interfaces, interface 1 (INT1), interface 2 (INT2), and interface 3 (INT3). One interface, such as INT1, interfaces the NIU 15 to messaging platform 35 on the host computer 11. Communication between INT1 and messaging platform 35 may, for example, be via a Small Computer Systems Interface (SCSI) bus 40. Others of the interfaces, such as INT2 and INT3 (of which there can be many), interface NIU 15 to PSTN 80. Interfaces such as INT1, INT2, and INT3 may be implemented on printed circuit boards housed within the NIU that can communicate with each other via a common bus 70, such as a bus that implements the Multibus II (IEEE 1296) open bus standard.

In this example, NIU 15 further includes an Embedded Services Processor (ESP) 50 that may comprise a single board computer having its own processor, memory, and operating system executing on the processor, which together provide a general purpose computing capability within NIU 15 for executing software applications that are otherwise incapable of executing within the NIU. Additionally, ESP 50 may further comprise a network interface for connection of NIU 15 to other communications networks external to the messaging system, such as communications network 60.

Media Resource Server (MRS) 65 may be connected to the messaging system via communication network 60 and the network interface of ESP 50 of NIU 15. In this example, software executing on host computer 11, ESP 50, and MRS 65, enables ESP 50 to offload selected multi-media processing functions to MRS 65, thereby eliminating the need for such processing functions to be performed by the voice messaging platform. For example, certain forms of voice processing may be offloaded to MRS 65, such as, Text-to-Speech (TTS) processing and Automatic Speech Recognition (ASR) processing. Any number of MRS units 65 may be attached to communication network 60.

System and Method For Accessing Voice Messaging System Data

The present invention facilitates support of a voice messaging system (VMS) via a personal computer or other processor by accessing a log record and a corresponding voice message from the voice messaging system.

Figure 2:
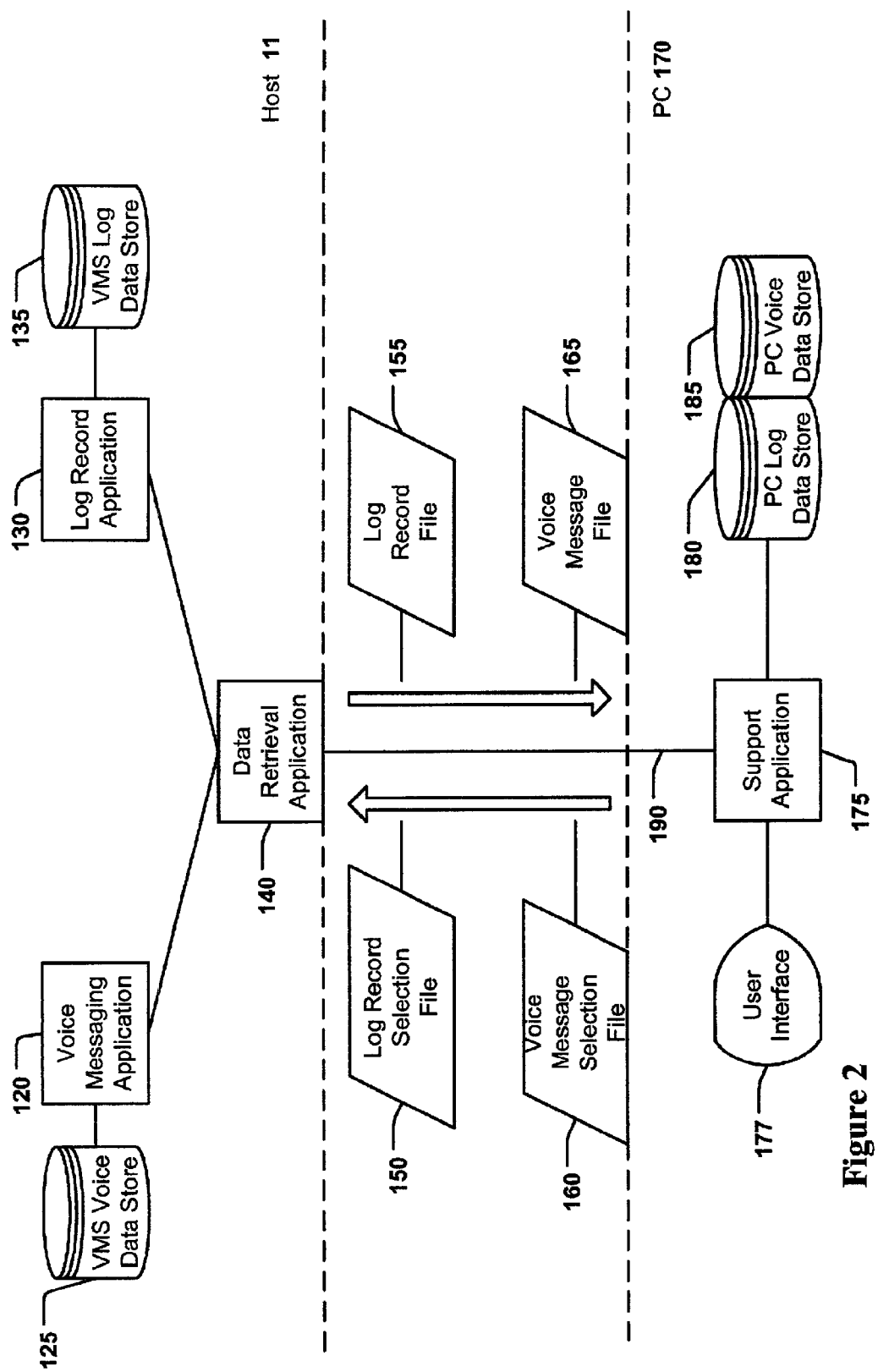
FIG. 2 is a block diagram of a system for accessing voice messaging system data in accordance with one embodiment of the present invention.

As shown in FIG. 2, host 11 of FIG. 1 is configured to include voice messaging application 120, log record application 130, and data retrieval application 140. Voice messaging application 120 interfaces with telephone-based subscribers 90 (FIG. 1) to provide voice messaging services associated with a telephone call. Voice messaging application 120 interfaces with VMS voice data store 125 and log record application 130 interfaces with VMS log data store 135 to store voice messaging system data, as described in more detail below.

Host 11 may provide ASR as one of the voice messaging services. In providing ASR as part of a telephone call, voice messaging application 120 receives a voice message and attempts to recognize such voice message as a word. Typically, voice messaging application 120 offloads such ASR to MRS 65 (FIG. 1). The present invention is not limited to ASR functionality, but contemplates any voice processing functionality.

Voice messaging application 120 stores the received voice message in VMS voice data store 125. VMS voice data store 125 contains a voice message and a corresponding voice message identification among other things. Also, voice messaging application 120 interfaces with log record application 130, such that log record application 130 stores information in a log record related to the telephone call in VMS log data store 135. VMS log data store 135 may contain the aforementioned voice message identification, a timestamp, a mailbox address, a recognized word, among other things.

Personal computer (PC) 170 includes support application 175 and user interface 177. The present invention is not intended to be limited to personal computers but contemplates any processor for interfacing with host 11. Personal computers and processors are generally know to the relevant public and therefore need not be described herein in any detail. Accordingly, such personal computer 170 or processor may be any particular personal computer 170 or processor without departing from the spirit and scope of the present invention.

Support application 175 interfaces with PC log data store 180 and PC voice data store 185 to store data received from voice messaging system 10. In one embodiment, PC log data store 180 is implemented with BORLAND Database Engine version 5.10 available from BORLAND Software Corporation (Scotts Valley, Calif.) and PC voice data store 185 is implemented with an individual file for each voice message. In the present embodiment, PC log data store 180 and PC voice data store 185 are the same data store; however, it is contemplated that different data stores may be used. In other embodiments, PC voice data store 185 is implemented with a single file containing all voice messages. Other embodiments are contemplated as long as a voice message of PC voice data store 185 may be mapped to a log record of PC log data store 180.

As shown in FIG. 2, host 11 and personal computer 170 are interconnected via data link 190. Data link 190 may be a local area network (LAN), wide area network (WAN), wireless network, an intranet, the Internet, and the like. In short, data link 190 may be any particular data link 190 without departing from the spirit and scope of the present invention.

The present invention allows a user (not shown) for example, a site support technician, to access voice messaging system data from support application 175, rather than directly from voice messaging system 10. As such, the user receives the advantages of a user friendly interface 177 associated with personal computer 170 or other processor.

In addition, a user of support application 175 does not require direct access to voice messaging system 10 or host 11. As such, access to voice messaging system 10 and host 11 may be limited so as to increase system reliability of such voice messaging system.

Moreover, the present invention allows a user to access voice messaging system data from a single application (e.g., support application 175), rather than multiple applications (e.g., voice messaging system 120 and log record application 130), as described above.

To support a voice messaging system having voice processing functionality, a tool for accessing voice messaging system data is desired. For example, a telephone-based subscriber may attempt to use ASR functionality of the voice messaging system by speaking 'One' into a telephone. However, the voice messaging system may not recognize the spoken 'One' as the word 'One'. The ASR may not recognize the spoken word for a multitude of reasons as described above.

To troubleshoot and improve the voice messaging system, it is desired that support personnel have easy access to voice messaging system data. For example, a particular telephone-based subscriber may state that the voice recognition functionality of the voice messaging system did not properly recognize the spoken word 'One' during several calls. Site support personnel may desire to access all log records and all voice messages for the particular telephone-based subscriber during such week to determine if the ASR functionality is malfunctioning or should be altered or enhanced. The present invention provides a method of accessing such voice messaging data.

Figure 3:
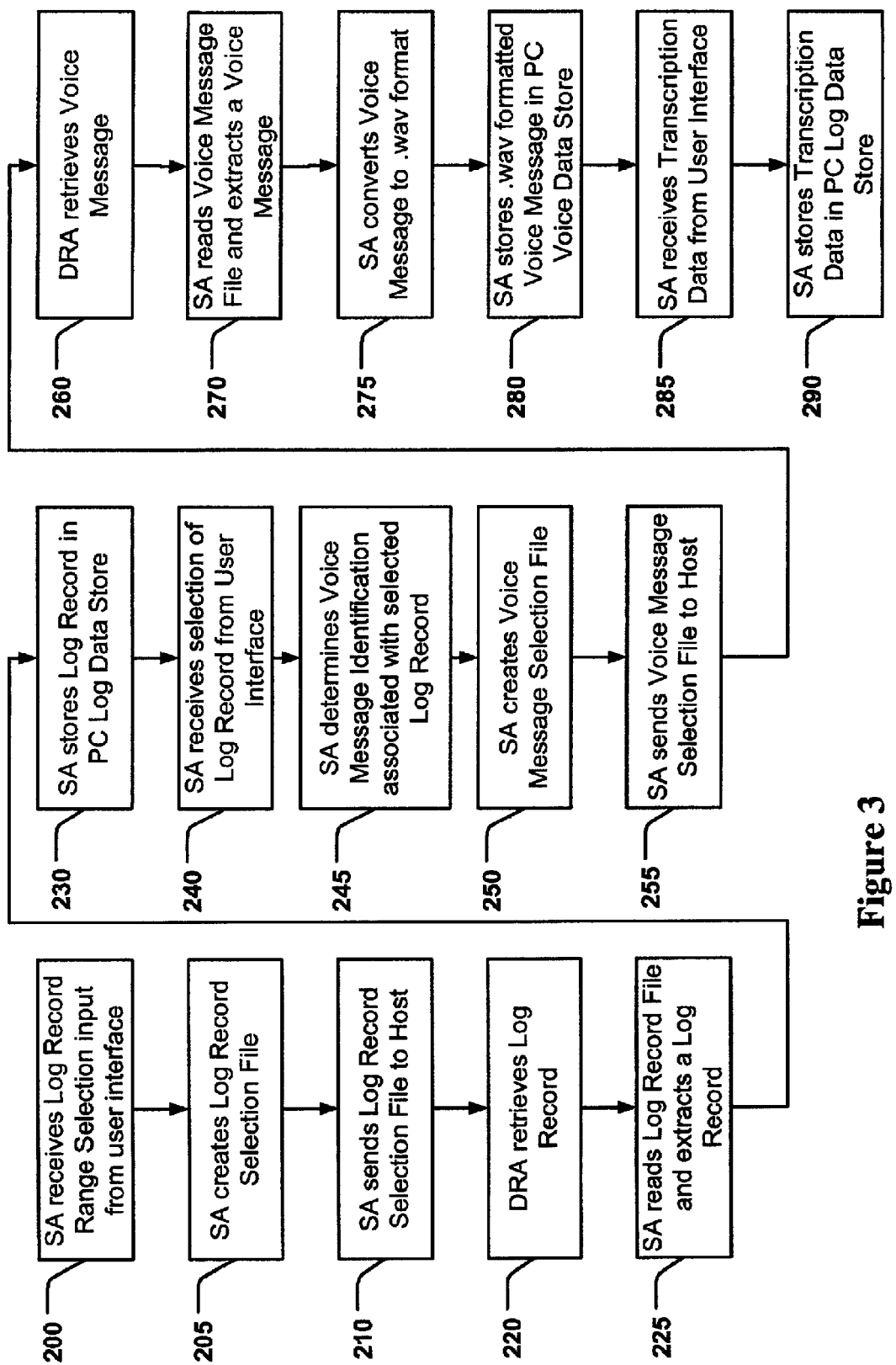
FIG. 3 is a flow diagram of a method of employing the system of FIG. 2 in accordance with one embodiment of the present invention.
Figure 5:
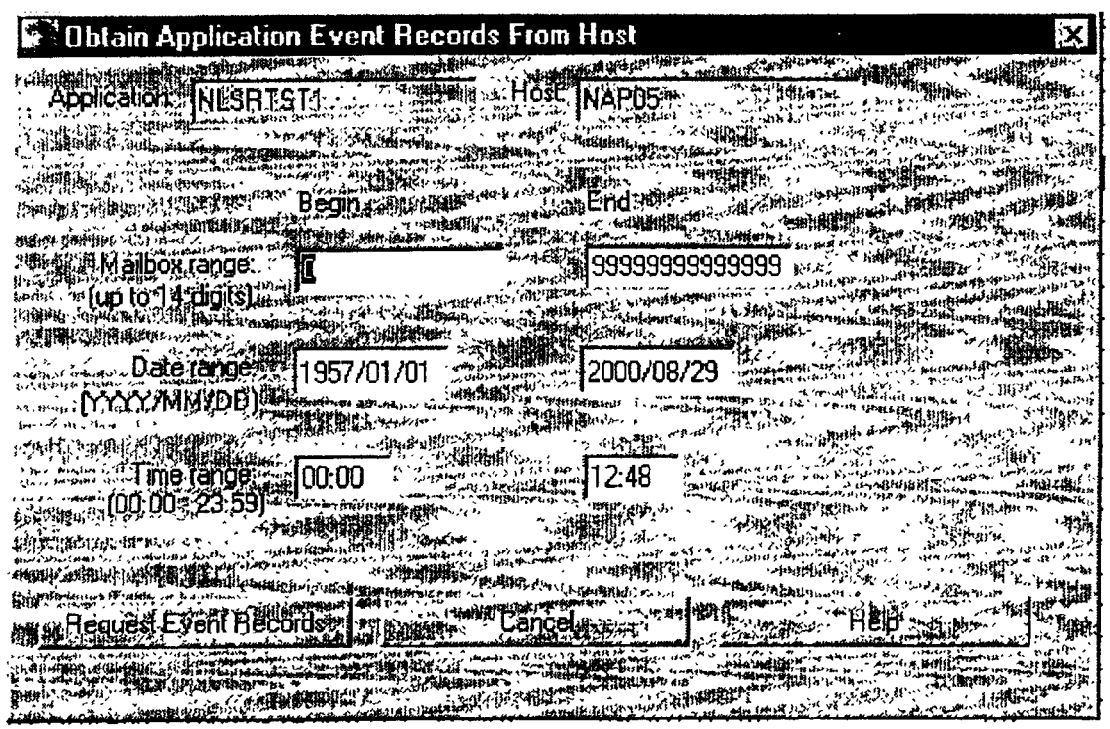
FIG. 5 is a screen shot of a log record range selection screen employed in connection with the method of FIG. 3 in accordance with one embodiment of the present invention.

FIG. 3 is a flow diagram of a method performed in connection with the system of FIG. 2 in accordance with one embodiment of the present invention. As shown in FIG. 3, at step 200, support application (SA) 175 receives log record range selection from user interface 177. A user (not shown) may enter such log record selection into user interface 177. The log record range selection may comprise a time range and/or a mailbox address range. For example, the log record range selection may comprise a begin date and time, an end date and time, a begin mailbox address, and an end mailbox address. The log record range selection determines the log records to be retrieved from voice messaging system 10. FIG. 5 shows a screen shot of a log record range selection screen 500 for the user to input the log record range selection.

At step 205, support application 175 creates a log record selection file 150 (shown in FIG. 2) based on the received log record range selection. For example, log record selection file 150 may comprise the begin date and time, the end date and time, the begin mailbox address, and/or the end mailbox address of the log record range selection received from the user interface 177.

At step 210, support application 175 sends the created log record selection file 150 to host 11. In one embodiment, support application 175 sends log record selection file 150 to host 11 via File Transport Protocol (FTP). In one embodiment, log record selection file 150 is converted to a host compatible file format by support application 175 before being sent to host 11. In another embodiment, log record selection file 150 is converted to a host compatible file format by data retrieval application 140 after being received by host 11.

At step 220, data retrieval application (DRA) 140 at host 11 retrieves a log record based on log record selection file 150 after host 11 receives such file.

Figures 4A, 4B:
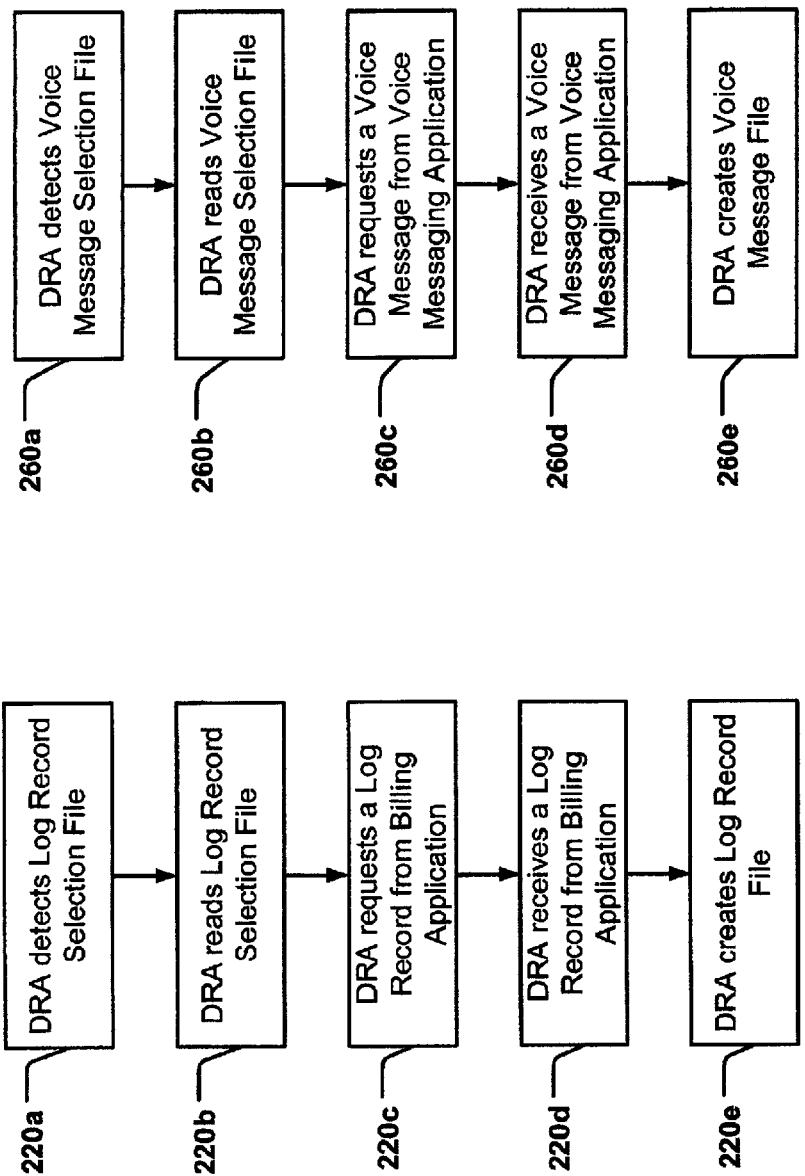
FIG. 4a is a flow diagram illustrating details of the method of FIG. 3 in accordance with one embodiment of the present invention.
FIG. 4b is a flow diagram illustrating further details of the method of FIG. 3 in accordance with one embodiment of the present invention.

At step 220a, as shown in FIG. 4a, data retrieval application 140 detects log record selection file 150. In one embodiment, data retrieval application 140 regularly searches host 11 for the log record selection file 150 by searching for a pre-defined filename. In one embodiment, when data retrieval application 140 detects log record selection file 150, data retrieval application 140 renames log record selection file 150 to minimize conflicts with other data requests.

At step 220b, data retrieval application 140 reads log record selection file 150. At step 220c, data retrieval application 140 requests a range of log records from log record application 130, corresponding to detected log record selection file 150. For example, if log record selection file contains a begin date and time of Feb. 12, 2001 at 1:00 p.m., an end date and time of Feb. 12, 2001 at 2:00 p.m., and a begin and end mailbox address of 1234, data retrieval application requests all voice messages from Feb. 12, 2001 at 1:00 p.m. to Feb. 12, 2001 at 2:00 p.m. for mailbox address 1234. Log record application 130 retrieves each log record corresponding to the requested range from VMS log data store 135 and sends each retrieved log record to data retrieval application 140.

At step 220d, data retrieval application 140 receives at least one retrieved log record from log record application 130 corresponding to the requested range of log records.

At step 220e, data retrieval application 140 creates a log record file 155 (shown in FIG. 2) including each requested and retrieved log record. In one embodiment, log record file 155 is converted to a personal computer compatible file format before being transferred to personal computer 170. In another embodiment, log record file 155 is converted to a personal computer compatible file format after being transferred to personal computer 170.

At step 225, as shown in FIG. 3, support application 175 reads log record file 155 as transferred to personal computer 170 and extracts each log record from log record file 155. In the present embodiment, support application 175 searches, regularly, the host 11 for the log record file by searching for a pre-defined filename. Also in the present embodiment, log record file 155 is transferred to personal computer 170 via FTP. At step 230, support application 175 then stores each extracted log record in PC log data store 180.

Support application 175 may support several VMSs. In one embodiment, support application 175 reformats the extracted log record from a VMS format to a user defined format before storing the extracted log record in PC log data store 180. In particular, such support application 175 uses a parse parameter file corresponding to the VMS from which the extracted log record was received to map VMS log record fields to user defined log record fields. In this manner, support application 175 may be used on any of several supplied voice messaging systems.

Figure 6:
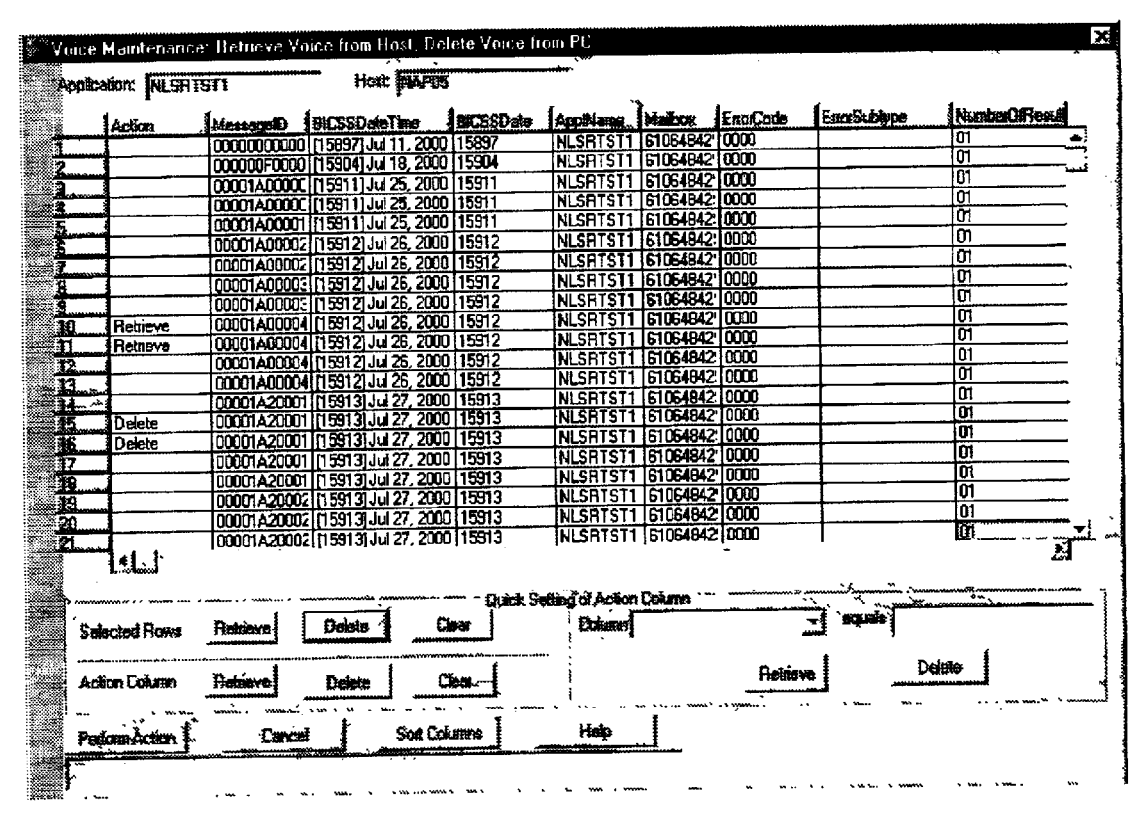

For example, the parse parameter file may include a plurality of entries, wherein each entry corresponds to a VMS log record field. Each entry may include a report number field, a description field, a starting position field, an ending position field, and a keyword field. The report number field corresponds to a report format that support application 175 may use to display a log record field on user interface 177. The report number field is used for selection of log records. The initial format of a screen for selecting log records, as best seen in FIG. 6, is based on the order of the records in the parse parameter file. As desired, the user may move columns of data via user interface to modify the display format. The description field may be used by support application 175 to display a log record field description on user interface 177. As shown in FIG. 6, the description field is used as the column header. For example in FIG. 6, the first parse parameter file record had a description field of 'MessageID.' The starting position field and ending position field may be used by support application 175 to determine a location of the log record field. The keyword field may be used to indicate a field used by support application 175 for a particular purpose. For example, if keyword is set to MessageID, this represents that support application 175 is to use this field as the voice message identification for retrieving a voice message from host 11.

After step 230, a copy of the extracted log record resides on personal computer 170 in PC log data store 180. However, the voice message corresponding to the log record still resides on host 11 and has not yet been retrieved for use on personal computer 170. The voice message has not yet been retrieved because voice messages are typically stored according to a voice message identification in a data store separate from the log record data store. The voice message identification, standing alone, does not provide information about the call, such as the time, date, and mailbox address of the call. Therefore, given a date, time, and a mailbox address, one cannot correlate to voice message without the log record. As such, a user first selects a log record based on the date, time, and mailbox address of a call and then the system retrieves a voice message based on the voice message identification associated with the selected log record.

To facilitate retrieval of a voice message, support application 175 may place log records from PC log data store 180 on the user interface. In this manner, a user may select a log record for retrieval of a corresponding voice message (i.e. a voice message selection).

FIG. 6 is a screen shot of a voice message selection screen 600. As seen in FIG. 6, the log records displayed on the tenth and eleventh row are selected for voice message retrieval as indicated by 'Retrieve' in the 'Action' column. As may be appreciated, a user may select and deselect a log record for retrieval of the corresponding voice message by highlighting the log record via a cursor device or the like and then activating the "Retrieve" and "Clear" button, respectively, with the cursor device or the like.

At step 240, support application 175 receives a selection of a log record from user interface 177. For example, a log record marked "Retrieve" is selected for retrieval of the corresponding voice message.

At step 245, support application 175 determines the voice message identification (e.g., MessageID of FIG. 6) corresponding to the selected log record by reading the log record from PC log data store 180. In particular, reading the voice message identification field of the log record. As may be appreciated, the voice message identification corresponds to a stored voice message in VMS voice data store 125 at host 11.

At step 250, support application 175 creates a voice message selection file 160 (shown in FIG. 2) based on the voice message identification corresponding to the selected log record. For example, the voice message selection file 160 may comprise a list of voice message identification(s) corresponding to the log record selected via the user interface 177.

At step 255, support application 175 sends voice message selection file 160 to host 11. In one embodiment, voice message selection file 160 is sent to host 11 via FTP. In one embodiment, the voice message selection file 160 is converted to a host compatible file format before being sent to host 11. In another embodiment, voice message selection file 160 is converted to a personal computer compatible file format after being received at personal computer 170

At step 260, data retrieval application 140 of host 11 retrieves a voice message based on voice message selection file 160 after host 11 receives such file.

At step 260a, as shown in FIG. 4b, data retrieval application 140 detects voice message selection file 160. In one embodiment, data retrieval application 140 regularly searches host 11 for voice message selection file 160 by searching for a pre-defined filename. In one embodiment, when data retrieval application 140 detects voice message selection file 160, data retrieval application 140 renames voice message selection file 160 to minimize conflicts with other data requests.

At step 260b, data retrieval application 140 reads voice message selection file 160.

At step 260c, data retrieval application 140 requests each voice message from voice messaging application 120, corresponding to detected voice message selection file 160. For example, if voice message selection file 160 contains voice message identification 9001 and 9002, data retrieval application 140 requests voice messages corresponding to voice message identification 9001 and 9002. Voice messaging application 120 retrieves each requested voice message from VMS voice data store 125 and sends each requested and retrieved voice message to data retrieval application 140.

At step 260d, data retrieval application 140 receives each requested and retrieved voice message from voice messaging application 120.

At step 260e, data retrieval application 140 creates a voice message file 165 (shown in FIG. 2) for each requested and retrieved voice message; however, in an alternate embodiment, data retrieval application 140 creates a voice message file 165 containing each requested and retrieved voice message. In one embodiment, voice message file 165 is converted to a personal computer compatible file format before being transferred to personal computer 170. In another embodiment, voice message file 165 is converted to a personal computer compatible file format after being transferred to personal computer 170.

At step 270, support application 175 reads voice message file 165 after personal computer 170 receives such file. In the present embodiment, support application 175 searches, regularly, host 11 for the voice message file by searching for a pre-defined filename. Also in the present embodiment, voice message file 165 is transferred to personal computer 170 via FTP. If voice message file 165 contains multiple voice messages, support application 175 extracts each voice message from voice message file 165.

At step 275, support application 175 converts each extracted voice message to a personal computer compatible format. In one embodiment, the voice message is converted to a .wav format although other formats may be employed without departing from the spirit and scope of the present invention.

At step 280, support application 175 stores each converted voice message in PC voice data store 185. At this step, both a log record and a corresponding voice message have been copied to and reside on personal computer 170. In this manner, the user, which may be a site support technician, may access a log record and a corresponding voice message to support voice messaging system 10, as described above. Moreover, the access is accomplished without direct access to host 11 and without cumbersome manual matching of a log record with a corresponding voice message via a voice message identification.

Figure 7:
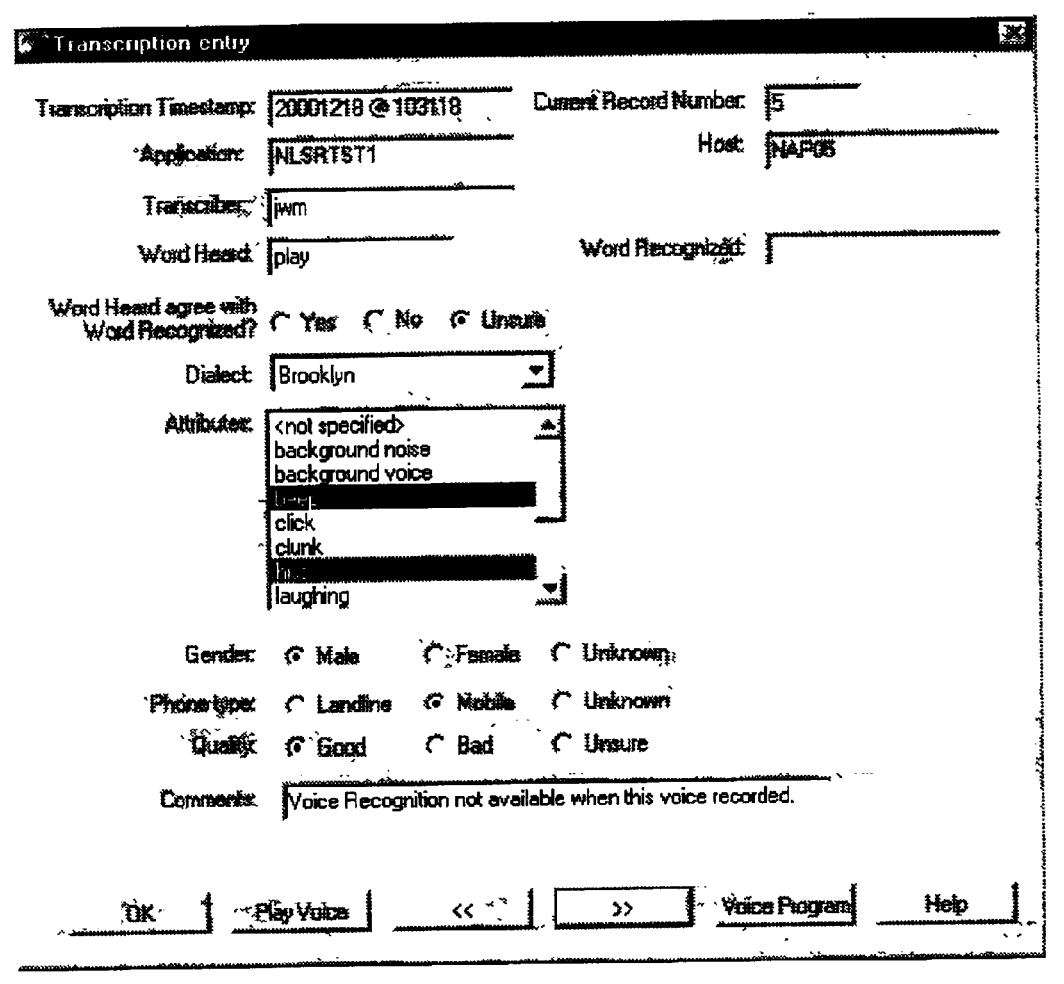

In addition to providing retrieval of a log record and corresponding voice message, the present invention also provides the ability to play the voice message and to enter and store transcription data to facilitate support of the voice messaging system. In particular, at step 285, support application 175 receives transcription data from user interface 177. For example, support application 175 may display a log record on user interface 177 as in FIG. 7 and receive transcription data from user interface 177. Transcription data may include a transcriber, a word heard, a dialect, a gender, a phone type, quality, comments, and the like. FIG. 7 is a screen shot of a transcription screen 700.

At step 290, support application 175 stores the received transcription data to PC log data store 180. Transcription data may assist site support personnel to troubleshoot voice processing functionality of a voice messaging system. For example, a spoken 'One' from a telephone-based subscriber with a Brooklyn accent may not be recognized as the word 'One' by an ASR program. A site support technician may determine that the accent is Brooklyn, the word heard is 'One', there was background noise, and the like. This information may be entered as transcription data and stored to PC log data store 180.

Transcription data may later be analyzed to determine if a particular ASR program may be altered or improved. If a particular ASR program never recognizes a Brooklyn accent, analysis of the transcription data may lead to the conclusion that the particular ASR should be modified.

Additionally, a user may elect to play the audio of a voice message corresponding to a log record to assist in troubleshooting. For example, on transcription screen 700 of FIG. 7, if a user selects 'Play Voice', support application 175 retrieves the voice message corresponding to the displayed log record from PC voice data store 185 and plays the audio of the voice message, for example, on a speaker of the personal computer 170. If the voice message has been converted to a personal computer compatible format, then support application 175 may use a conventional audio application to play the voice message on the personal computer.

As can been appreciated, the present invention provides a useful system and method of accessing voice messaging data. A user, such as a site support technician, may access a log record and a corresponding voice message based on a begin date and time and an end date and time. Further, the present invention retrieves a voice message for a selected log record and makes the voice message readily available for playback by the user. Moreover, the user may enter transcription data, thereby facilitating troubleshooting, debugging, etc.

The present invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. Additionally, the support application 175 and the data retrieval application 140 may be embodied in the form of different portions of the program code. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular structures, methods, materials, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A method for accessing voice messaging system data residing on a first computer by way of a second computer, the voice messaging system data comprising a plurality of voice messages and a log record corresponding to each voice message, the method operable at the second computer comprising:

Receiving a log record range selection, said log record range selection identifying a specific range within a log record by at least one parameter, said receiving done from a user interface implemented on the second compute;

creating a log record selection file identifying said at least one log record range selection parameter, corresponding to the received log record range selection;

sending the created log record selection file to the first computer;

receiving a log record file from the first computer in response to the sent log record selection file, said log record file comprising a set of log records identifying voice records on said first computer which were identified by said log record selection file, sent;

creating a voice message selection file indicating desired ones of said identified voice records in said set of log records from said log record file, sending said voice message selection file to said first computer, and receiving any voice message files identified by said voice message file from said first computer.

2. The method of claim 1 further comprising extracting a log record from the received log record file.

3. The method of claim 2 further comprising storing the extracted log record in a data store of the second computer.

4. The method of claim 1 wherein the log record range selection parameter comprises a date and time range and a mailbox address range.

5. The method of claim 1 wherein the sending the created log record selection file comprises sending the created log record selection file via a file transport protocol.

6. The method of claim 1 wherein the receiving a log record file comprises searching, regularly, the first computer for the log record file by searching for a pro-defined filename.

7. The method of claim 1 wherein the voice message selection file comprises a voice message identification corresponding to the selected log record.

8. The method of claim 1 further comprising extracting a voice message from the at least one voice message file.

9. The method of claim 8 further comprising converting the extracted voice message to a personal computer compatible format.

10. The method of claim 9 wherein the converting the extracted voice message comprises converting the extracted voice message to a .wav format.

11. The method of claim 10 further comprising storing the converted voice message in a data store of the second computer.

12. The method of claim 1 further comprising:

receiving a second log record selection from the user interface implemented on the second computer; and playing a voice message corresponding to the second selected log record, in an audio format.

13. The method of claim 1 further comprising:

receiving transcription data from the user interface implemented on the second computer; and storing the received transcription data to a data store of the second computer.

14. The method of claim 13 wherein the receiving transcription data comprises receiving one of a transcriber, a word heard, a dialect, a gender, a phone type, quality, and a comment.

15. A computer-readable medium having instructions stored thereon for accessing voice messaging system data residing on a first computer by way of a second computer, the voice messaging system data comprising a plurality of voice messages and a log record corresponding to each voice message, the instructions, when executed on the second computer, causing the second computer to perform the following:

receiving a log record range selection, said log record range selection identifying a specific within a log record by at least one parameter, said receiving done from a user interface implemented on the second computer;

creating a log record selection file identifying said at least one log record range selection parameter, corresponding to the received log record range selection;

sending the created log record selection file to the first computer;

receiving a log record file from the first computer in response to the sent log record selection file, said log record file comprising a set of log records identifying voice records on said first computer which were identified by said log record selection file, creating a voice message selection file indicating desired ones of said identified voice records in said set of log records from said log record file, sending said voice message selection file to said first computer, and receiving any voice message files identified by said voice message file from said first computer.

16. The computer-readable medium of claim 15 wherein the instructions further cause the second computer to perform enacting a log record from the received log record file.

17. The computer-readable medium of claim 15 wherein the log record range selection parameter comprises a date and time range and a mailbox address range.

18. The computer-readable medium of claim 18 wherein the sending the created log record selection file comprises sending the created log record selection file via a file transport protocol.

19. The computer-readable medium of claim 18 wherein the instructions further cause the second computer to perform storing the extracted log record in a data store of the second computer.

20. The computer-readable medium of claim 15 wherein the voice message selection file comprises a voice message identification corresponding to the selected log record.

21. The computer-readable medium of claim 15 wherein the instructions further cause the second computer to perform extracting a voice message from the voice message file.

22. The computer-readable medium of claim 21 wherein the instructions further cause the second computer to perform converting the extracted voice message to a personal computer compatible format.

23. The computer-readable medium of claim 22 wherein the converting the extracted voice message comprises converting the extracted voice message to a .wav format.

24. The computer-readable medium of claim 23 wherein the instructions further cause the second computer to perform storing the converted voice message in a data store of the second computer.

25. The computer-readable medium of claim 15 wherein the instructions further cause the second computer to perform:

receiving a second log record selection from the user interface implemented on the second computer; and playing a voice message corresponding to the second selected log record, in an audio format.

26. The computer-readable medium of claim 15 the instructions further cause the second computer to perform:

receiving transcription data from the user interface implemented on the second computer; and storing the received transcription data to a data store of the second computer.

27. The computer-readable medium of claim 26 wherein the receiving transcription data comprises receiving one of a transcriber, a word heard, a dialect, a gender, a phone type, quality, and a comment.

28. A method for accessing voice messaging system data residing on a first computer by way of a second computer, the voice message system data comprising a plurality of voice messages and a log record corresponding to each voice message, to voice messaging system comprising a voice messaging application and a log record application, the method at the first computer comprising:

receiving a log record selection file from the second computer;

reading the received log record selection file;

requesting a rage of log records from the log record application, the requested range of log records corresponding to the read log record selection file;

receiving at least one log record from the log record application in response to requesting a range of log records;

creating a log record file based on each of the received log records, sending the log record file to said second computer, receiving a voice message selection file from said second computer, and, sending voice mail message files identified by said voice message selection file to said second computer.

29. The method of claim 28 further comprising detecting the received log record selection file.

30. The method of claim 29 wherein the detecting the received log record selection file comprises searching, regularly, the first computer for the log record selection file by searching for a pre-defined filename.

31. The method of claim 29 wherein the detecting the received log record selection file comprises renaming the detected log record selection file to minimize conflicts with other data requests.

32. The method of claim 28 further comprising:

reading the received voice message selection file, the voice message selection file containing at least one voice message identification;

requesting, from the voice messaging application, a voice message corresponding to each voice message identification of the voice message selection file;

receiving at least one voice message from the voice messaging application; and creating said voice message file based on the at least one received voice message.

33. The method of claim 32 further comprising detecting the received voice message selection file.

34. The method of claim 33 wherein the detecting the received voice message selection file comprises searching, regularly, the first computer for the voice message selection file by searching for a pre-defined filename.

35. The method of claim 33 wherein the detecting the received voice message selection file comprises renaming the detected voice message selection file to minimize conflicts with other data requests.

36. A computer-readable medium having instructions stored thereon for accessing voice messaging system data residing on a first computer by way of a second computer, the voice messaging system data comprising a plurality of voice messages and a log record corresponding to each voice message, the voice messaging system comprising a voice messaging application and a log record application, the instructions, when executed on the first computer, causing the first computer to perform the following:

reading a log record, selection file, the log record selection file being received by the first computer from the second computer;

requesting a range of log records from the log record application, the requested range of log records corresponding to the read log record selection file;

receiving at least one log record from the log record application in response to requesting a range of log records;

creating a log record file based on each of the received log records sending the log record file to said second computer, receiving a voice message selection file from said second computer, and, sending voice mail message files identified by said voice message selection file to said second computer.

37. The computer-readable medium of claim 36 wherein the instructions further cause the first computer to perform detecting the received log record selection file.

38. The computer-readable medium of claim 37 wherein the detecting the received log record selection file comprises searching, regularly, the first computer for the log record selection file by searching for a pre-defined filename.

39. The computer-readable medium of claim 37 wherein the detecting the received log record selection file comprises renaming the detected log record selection file to minimize conflicts with other data requests.

40. The computer-readable medium of claim 36 wherein the instructions further cause the first computer to perform:

reading the received voice message selection file, the voice message selection file containing at least one voice message identification;

requesting, from the voice messaging application, a voice message corresponding to each voice message identification of the voice message selection file;

receiving at least one voice message from the voice messaging application; and creating said voice message file based on the at least one received voice message.

41. The computer-readable medium of claim 40 further comprising detecting the received voice message selection file.

42. The computer-readable medium of claim 41 wherein the detecting the received voice message selection file comprises searching, regularly, the first computer for the voice message selection file by searching for a pre-defined filename.

43. The computer-readable medium of claim 41, wherein the detecting the received voice message selection file comprises renaming the detected voice message selection file to minimize conflicts with other data requests.

44. A system for accessing voice messaging system data residing on a first computer by way of a second computer having a user interface, the voice messaging system data residing on said second computer and having voice messages and a log record corresponding to each voice message, the voice messaging system having a voice messaging application and a log record application, the system comprising:

a support application executing on the second computer; and a data retrieval application executing on the first computer;

the support application for receiving a log record range selection from the user interface of the second computer, creating a log record selection file based on the received log record range selection, sending the created log record selection file to the first computer, and for receiving back from said first computer a voice message selection file, to enable use of voice messages from said voice message selection file at said second computer, the support application also for receiving and reading the log record file, and extracting a log record from the log record file the data retrieval program for reading the log record selection file, requesting a log record from the log record application, the requested log record corresponding to the log record selection file, receiving a log record from the log record application, creating a log record file containing the received log record, and sending said log record file to said second computer, and after receiving a responsive voice message selection file from said second computer, creating a voice message file and sending said voice message file to said second computer.

45. The system or claim 44, the support application further receiving transcription data from the user interface and storing the received transcription data to a data store of the second computer.

46. A computer-readable medium having computer-executable modules/components for accessing voice messaging system data residing on a computer by way of a second computer having a user interface, the voice messaging system data comprising a plurality of voice messages and a log record corresponding to each voice message, the voice messaging system comprising a voice messaging application and a log record application, the computer-executable modules/components comprising:

a support application for executing on the second computer; and a data retrieval application for executing on the voice messaging system;

the support application for receiving a log record range selection from the user interface of the second computer, creating a log record selection file, based on the received log record range selection, sending the created log record selection file to the first computer, and for receiving back from said first computer a voice message selection file, to enable use of voice messages from said voice message selection file at said second computer, the support application also for receiving and reading the log record file, and extracting a log record from the log record file the data retrieval program for reading the log record selection file, requesting a log record from the log record application, the requested log record corresponding to the log record selection file, receiving a log record from the log record application, creating a log record file containing the received log record, and sending said log record file to said second computer, and after receiving a responsive voice message selection file from said second computer, creating a voice message file and sending said voice message file to said second computer.

47. The computer-readable medium of claim 46, the support application when executed on the second computer further receiving transcription data from the user interface and storing the received transcription data to a data store of the second computer.

48. A method implemented on two computer systems in network communication with each other, for accessing voice messaging system data residing on a first computer by way of a second computer, the voice messaging system data comprising a plurality of voice messages and a log record corresponding to each voice message, the method comprising:

sending a log record selection file from the second computer to the first computer, the log record selection file containing a log record range selection;

receiving and reading a log record file at the second computer, the log record file received from the first computer in response to the first computer receiving the log record selection file;

extracting log records from the log record file at the second computer;

receiving log record selection from the user interface implemented on the second computer, the log record selection being a log record selected from the extracted log records, and creating a voice message selection file based on said log record selection;

sending a voice massage selection file to the first computer, the voice message selection file based on the received log record selection;

retrieving voice records and creating a voice message file from them at the first computer, responsive to receiving said voice message selection file; and receiving and reading a voice message file at the second computer, the voice message file received from the first computer in response to sending the voice message selection file to the first computer.

* * * * *